Aug. 19, 1924. 1,505,491
J. W. PRICE
AIR CHUCK
Filed March 22, 1923   2 Sheets-Sheet 2
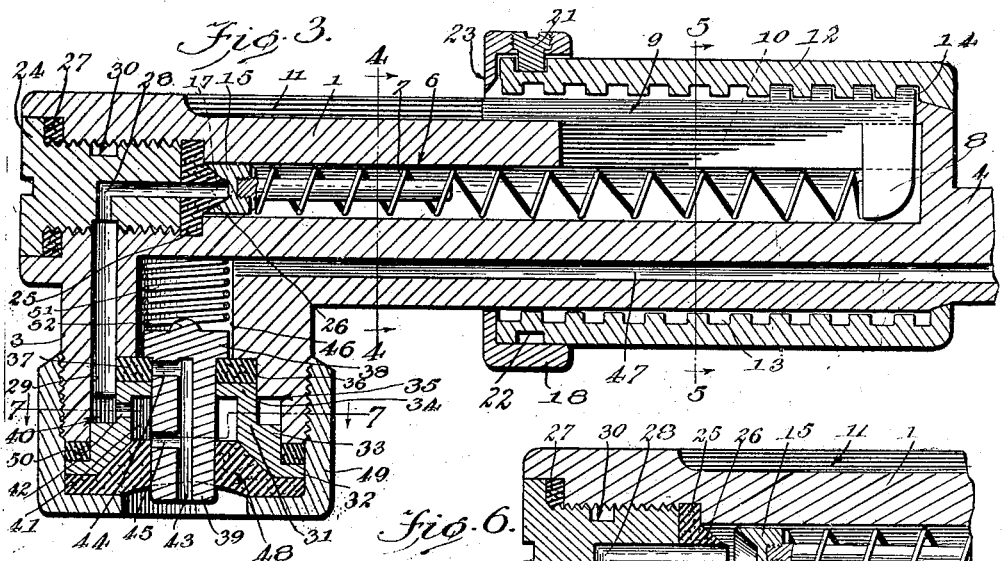
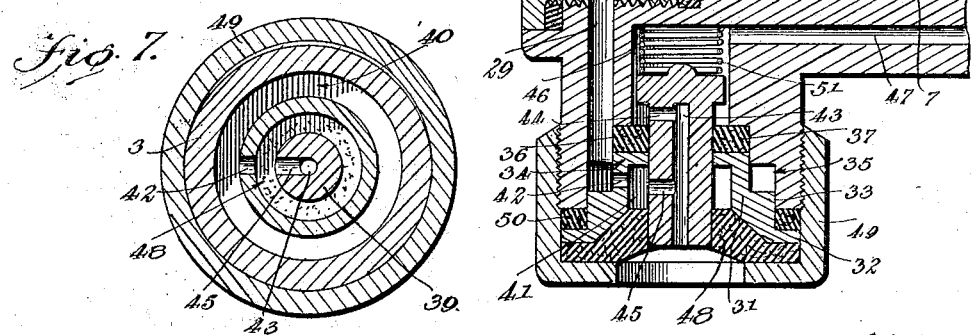
WITNESSES
INVENTOR
J.W. Price,
BY
ATTORNEYS Patented Aug. 19, 1924.

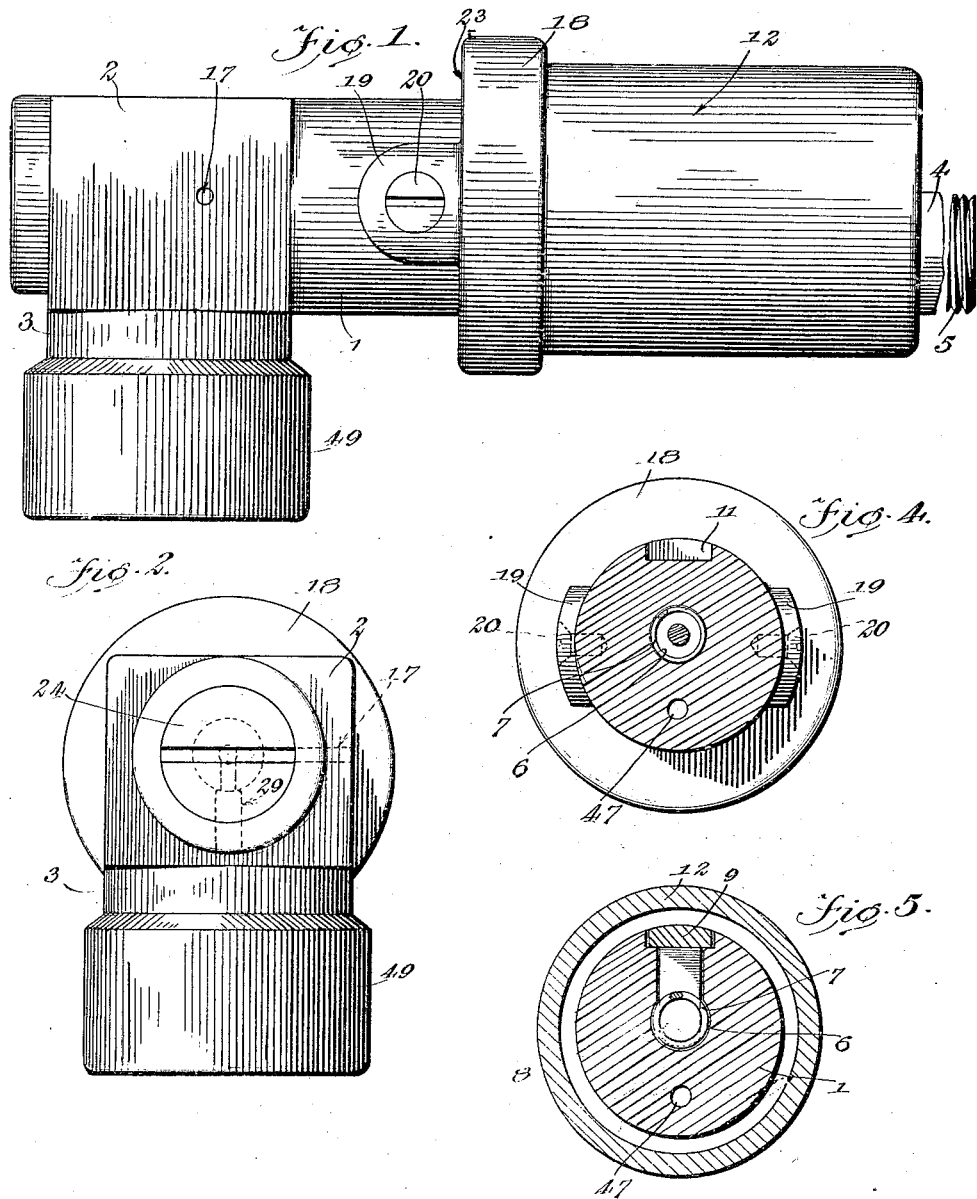

1,505,491

UNITED STATES PATENT OFFICE.

JAMES W. PRICE, OF TULSA, OKLAHOMA, ASSIGNOR TO THE TULSA INVENTION COMPANY, OF TULSA, OKLAHOMA, A CORPORATION OF OKLAHOMA.

AIR CHUCK.

Application filed March 22, 1923. Serial No. 626,994.

*To all whom it may concern:*

Be it known that I, JAMES W. PRICE, a citizen of the United States, and a resident of Tulsa, in the county of Tulsa and State of Oklahoma, have invented certain new and useful Improvements in Air Chucks, of which the following is a specification.

My invention relates to improvements in air valves, commonly known as air chucks and consists of the constructions, combinations and mode of operation herein described and claimed.

An object of the invention is to provide an air chuck which can readily be set for any desired pressure of air with which it is desired to fill a tire, the release of air which occurs when said pressure is reached being a warning to the operator to remove the chuck from the valve tube of the tire.

Another object of the invention is to provide an air chuck which has a spring bar in the shape of a slide which is adapted to be moved by a hand piece for the adjustment of the chuck to various degrees of pressure at which a pressure release is desired to be had.

Other objects and advantages will appear in the following specification, reference being had to the accompanying drawings, in which:

Fig. 1 is a side elevation of the improved air chuck,

Fig. 2 is a front end view,

Fig. 3 is a longitudinal section of the air chuck,

Fig. 4 is a cross section on the line 4—4 of Fig. 3,

Fig. 5 is a cross section on the line 5—5 of Fig. 3,

Fig. 6 is a detail section of the chuck head showing the position of the plug valve when applied to a valve tube, Fig. 7 is a detail cross section on the line 7—7 of Fig. 3, Fig. 8 is a detail plan view of the graduated spring bar, and Fig. 9 is a detail perspective view of the metal bushing which is situated in the chuck head.

The construction comprises the body 1 which is cylindrical for the major part of its length but is made square at 2 adjacent to the place where it merges into the head 3. The cylindrical body 1 terminates in a nozzle 4 which is suitably threaded at 5 for the connection of an air hose with which the air chuck is intended to be used in combination. A cylindrical chamber 6 running lengthwise of the body 1 contains a spring 7 which is adapted to press against the heel 8 of a slide or spring bar 9.

A slot 10 extending part of the length of the body 1 permits the sliding movement of the spring bar in the setting of the latter for various tire air pressures. The spring bar itself moves in a groove 11 on top of the body 1, and obviously, both the length of the slot 10 and of the groove 11 serve to limit the amount of extensible movement of the spring bar 9 in respect to a hand piece 12 by which it is adjusted. The hand piece has internal threads 13 which have engagement with threads 14 on the spring bar. By turning the hand piece (toward the right for example) the spring bar 9 is advanced from beneath the hand piece and in the groove 11.

By virtue of the fact that the heel 8 engages the spring 7, the reader can readily see that the adjustment or advancement of the spring bar 9 will increase the tension of the spring. This spring bears against an escape valve 15 and the greater the tension of the spring against this valve, the greater will the air pressure have to be in order to unseat the valve for the escape of air.

Graduations 16 on top of the spring bar 9 serve to designate the various pressures for which the chuck may be set. These graduations are accompanied by pressure indications reading in pounds. The turning of the hand piece 12 will reveal the various indications in succession. These indications correspond with the accompanying set pressures of the spring 7 against the escape valve 15 and serve to tell the operator what pressure of air must be present in the tire to overcome the tension of the spring 7 for the unseating of the valve 15. When this valve unseats the air escapes at a port 17 with a hissing sound, serving as a warning that the tire is filled to the required presure and that the chuck should be removed.

A collar 18 has ears 19 through which screws 20 pass in order to provide a fastening against the body 1. The collar 18 is intended to be held in one place. It carries a screw 21 the smooth shank of which occupies an annular groove 22 in the adjacent end of the hand piece 12. This engagement of the screw with the groove provides a swivel joint which permits rotating the hand piece 12 but prevents any relative longitudinal movement thereof. As stated before, the rotation of the hand piece 12 moves the spring bar 9 back and forth in the groove 11. The front wall 23 of the collar 18 adjacent to the groove 11 serves as a pointer in reference to which the graduations 16 are to be moved in fixing the desired adjustments of the spring bar.

A valve set screw 24 is fitted into the body 1 from the front of the non-circular portion 2 of the head. This screw bears against a gasket 25 which not only makes a tight joint around the thread of the screw, but also provides a seat for the valve 15. This valve has a depression 26 in which a corresponding protuberance of the gasket 25 fits. The head of the screw 24 bears against a gasket 27 which makes an air-tight joint at this point.

A passage 28 through the set screw 24 offers communication between the escape valve 15 and the bore 29 in the head 3. A part of this passage runs along the axis of the screw but another part turns at right angles and enters an annular groove 30. The purpose of this groove is to insure the aforesaid communication regardless of the particular position into which the right angled portion may be turned in tightening the screw. A metal bushing 31 is fitted into the head 3 from beneath. This bushing has a plurality of steps 32, 33 and 34 of successively decreasing diameters. The step 33 occupies part of a recess 35 in the head 3, while the step 34 occupies part of a recess 36. The latter recess also contains a gasket 37 against which the head 38 of the valve plug 39 bears when seated. The recess 35 and the adjacent parts 33 and 34 of the metal bushing 31 define an annular air chamber 40 with which the bore 29 communicates. Communication with the chamber 41 inside of the bushing 31 is had through a port 42.

The valve plug 39 has a central passage 43 with lateral ports 44 and 45. The former is adapted to take a position within the gasket 37 when the valve is seated and thus prevent the flow of air from the air chamber 46. This particular port is adapted to communicate with the air chamber 46 when the plug 39 is unseated, as shown in Fig. 6. The chamber 46 is supplied with air through the main passage 47 which leads to the nozzle 4. The other port 45 is adapted to partly enter a gasket 48, but not far enough to entirely cut off communication with the bore 29. The remaining opening of the port 45 is useful in permitting the escape of residual air from the bore 29 after the escape valve 15 has again closed.

A cap 49 holds all of the parts in the various recesses 35 and 36 in place. This includes a gasket 50 against which the step 32 of largest diameter of the bushing bears in making a tight joint with the rim of the head 3. The cap has a suitable opening which admits the valve tube of the tire. A spring 51 bears on the head 38 of the valve 39 and keeps it seated so that no air under pressure may enter the port 44. This head has a knob 52 which is adapted to strike the roof of the chamber 46 should the valve 39 be pushed in excessively far, thereby leaving room for the passage of air from the passage 47 and preventing an interruption which may possibly be detrimental.

The operation may be briefly reviewed to advantage. The operator, desiring to fill a tire with compressed air, will first set the air chuck to the pressure desired. This is done by turning the hand piece 12 which has a swivel connection with the collar 18. This collar is fixed on the body 1 of the air chuck, and although the hand piece 12 is capable of turning it does not have relative longitudinal movement.

The turning of the hand piece 12 causes the extension of the spring bar 9 from beneath the pointer 23. The operator must observe the various pressure indications 16 (Fig. 8) as they come into view, stopping the turning of the hand piece 12 when the desired pressure is indicated. The air chuck is next applied to the air tube of a tire.

The seating movement displaces the valve plug 39 so that air communication with the chamber 46 is had. The air enters the port 44 and passes down the central passage 43. Some of the air also enters the port 45 and finally reaches the passage 28 in the set screw 24. The escape valve 15 is prevented from opening by the tension of the spring 7. This spring was put under tension by the advancement of the heel 8 during the adjustment of the spring bar 9.

When the pressure of air in the tire slightly exceeds the equivalent pressure or tension of the spring 7 against the escape valve 15, the latter is unseated so that the air may escape at the port 17. The accompanying hissing sound will warn the operator that the desired tire air pressure is reached. The air chuck is removed and the hand piece 12 turned in the reverse direction so as to again secrete the spring bar 9 within the body of the chuck.

While the construction and arrangement of the improved air chuck as herein described and claimed is that of a generally preferred form, obviously modifications and changes may be made without departing from the spirit of the invention or the scope of the claims.

I claim:

1. A device of the character described comprising a body having a groove and a chamber connected by a slot, means adapted to slide in the groove and having a heel extending through the slot into the chamber, a head forming part of the body having a bore communicable with the chamber, a valve in the chamber, means engaging the valve and the heel being adapted to keep the valve seated, and means operable on the body adapted to actuate said slide means to advance the heel in said slot and chamber and thereby impart varying degrees of pressure to said seating means requiring a preponderance of air pressure in said bore before said valve will unseat.

2. A device of the character described comprising a body having a groove and a chamber, a bar slidable in the groove having a heel reaching into the chamber, means having a swivel mounting on the body, means providing an engagement between the swivel means and said bar to slide the bar when said means is turned, a head forming part of the body having an air pressure bore communicable with the chamber, an escape valve situated in the chamber adapted to sever communication of the bore with the chamber, and a spring situated in the chamber bearing against said valve and said heel.

3. A device of the character described comprising a body having a groove and a chamber, a bar slidable in the groove and having a heel extending into the chamber, a hand piece carried by the body, thread connections between the hand piece and slide, means by which the hand piece is swivelly mounted on the body permitting adjustment of the bar, graduations on the bar associated with said swivelling means to form an index of pressures, a head forming part of the body having a valve controlled air pressure bore communicable with the chamber, an escape valve in the chamber, and a spring between said valve and heel adapted to close the bore until the air pressure therein preponderates that of the spring.

4. In a device of the character described, a body having a groove, a chamber and a slot between the two extending part of their length, an escape valve situated in the chamber, a spring in the chamber engaging the valve, a spring bar slidable in the groove, and a heel carried by the bar extending through the slot for engagement with the other end of the spring.

5. In a device of the character described a body having a groove, a chamber and a slot between the two extending part of their length, an escape valve situated in the chamber, a spring in the chamber engaging the valve, a spring bar slidable in the groove, a heel carried by the bar extending through the slot for engagement with the other end of the spring, a hand piece carried by the body, and thread connections between the hand piece and spring bar for sliding the lever in said groove.

6. In a device of the character described a body having a groove, a chamber and a slot between the two extending part of their length, an escape valve situated in the chamber, a spring in the chamber engaging the valve, a spring bar slidable in the groove, a heel carried by the bar, extending through the slot for engagement with the other end of the spring, a hand piece carried by the body, thread connections between the hand piece and spring bar for sliding the lever in said groove, a collar fastened to the body into which one end of the hand piece extends, and means carried by the collar having engagement with said end providing a swivel connection.

7. A device of the character described comprising a body with a groove, an escape valve incorporated in the body, a spring bar slidable in the groove and having associated means for seating the valve, a cylindrical hand piece fitted over one end of the body and being adapted to conceal the spring bar, thread connections between the two, means by which the hand piece is swivelled on the body causing the appearance of the spring bar from its concealment in the hand piece as the latter is turned, and pressure indications inscribed on the spring bar appearing at an adjacent side of the swivel means indicating the approximate pressure with which the escape valve is seated.

8. A device of the character described comprising a safety valve body having an air pressure inlet and a chamber, a valve in the chamber closing said inlet, a spring in the chamber seating the valve, a bar slidable on the body and having a heel abutted by the spring, a handpiece swiveled on the body, and engaging means between the handpiece and bar to slide the latter when the hand piece is turned and thereby vary the tension of the spring.

JAMES W. PRICE.